Figure 1:
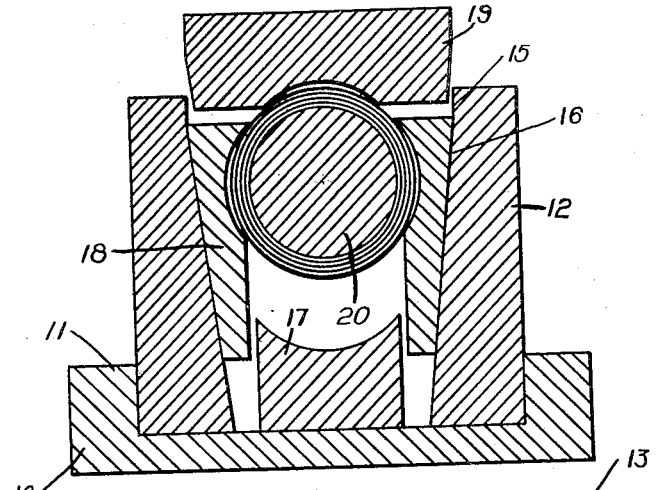

W. H. KEMPTON.
MOLD FOR MICARTA TUBES, RODS, OR THE LIKE.
APPLICATION FILED OCT. 8, 1918.

1,386,003.

Patented Aug. 2, 1921.
2 SHEETS—SHEET 1.

WITNESSES:
H. B. Funk.
W. H. Woodman.

INVENTOR
Willard H. Kempton.
BY
Wesley G. Carr
ATTORNEY

W. H. KEMPTON.
MOLD FOR MICARTA TUBES, RODS, OR THE LIKE.
APPLICATION FILED OCT. 8, 1918.

1,386,003.

Patented Aug. 2, 1921.
2 SHEETS—SHEET 2.

WITNESSES:
H.B. Funk.
W. H. Woodman.

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLD FOR MICARTA TUBES, RODS, AND THE LIKE.

1,386,003.

Specification of Letters Patent.

Patented Aug. 2, 1921.

Application filed October 8, 1918. Serial No. 257,388.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molds for Micarta Tubes, Rods, and the like, of which the following is a specification.

My invention relates to molds for use in the manufacture of rods and tubes and more particularly to molds employed in forming rods and tubes comprising a plurality of superimposed layers of fibrous sheet material impregnated with a suitable binder, such as a phenolic condensation product which may be hardened during the molding operation.

Heretofore, in forming rods and tubes of the character above designated, considerable difficulty has been encountered in the molding operation, as the paper or other sheet material employed would oftentimes become caught between the parts of the mold as they were being brought together and either be cut off or would prevent proper closing of the mold and so result in imperfect compression of the molded article.

One of the objects of my present invention resides in constructing a mold of such character that the rod or tube is partially molded between certain of the mold sections which are brought to substantially their fully-closed position about the article, and against the remaining mold section, leaving a space at one side between the article and the remaining mold section for the material being molded to flow under the pressure applied. Under these circumstances, when the mold sections are brought to their fully-closed position, to close the space in which the material has run and so complete the molding operation, there is no opportunity for material to flow between the sections to prevent proper movement of all parts to their closed positions.

A still further object of my invention resides in constructing a mold in such manner that it may be employed in a press of conventional type and so that a single closing of the press will be sufficient to bring the mold sections from their initial to their final positions, thereby rendering the molding operation unusually simple.

With these and other objects in view, my invention will be more fully described; illustrated in the drawings, in the several views of which corresponding numerals indicate like parts, and then particularly pointed out in the claims.

Figure 2:
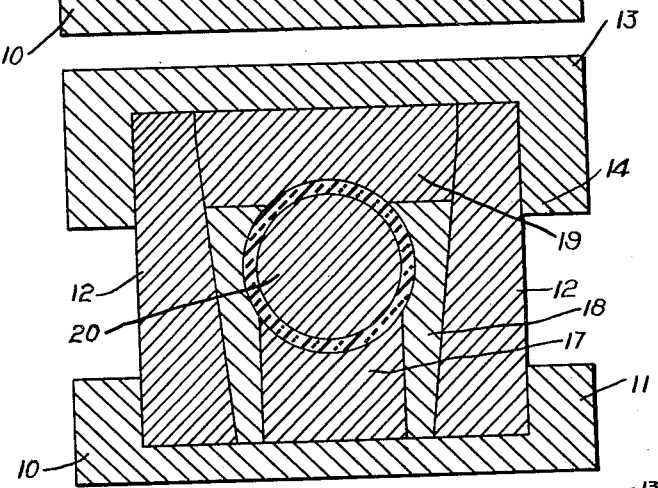
Figure 3:
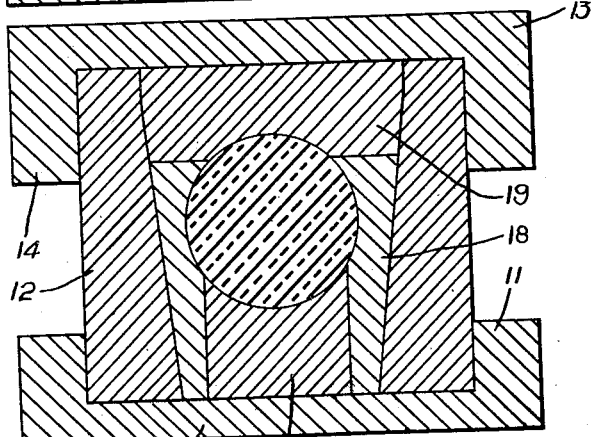
Figure 4:
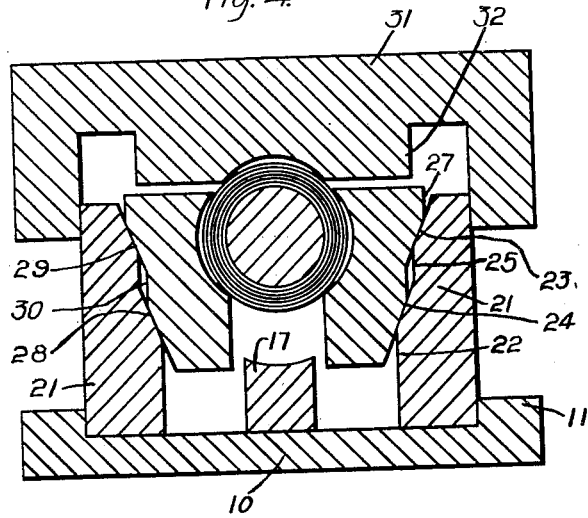
Figure 5:
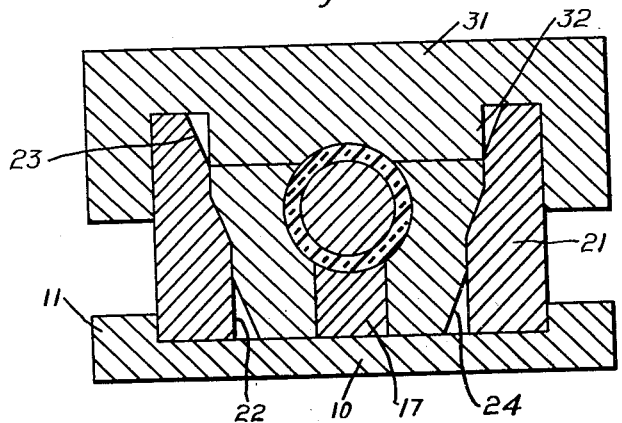

Figure 1 is the vertical, transverse, sectional view taken through my improved mold, showing a green or uncured tube, upon its forming mandrel, disposed within the mold, the forming sections or splits of the mold being shown in their initial positions; Fig. 2 is a corresponding view, showing the top plate of the mold applied and the mold in its closed position, the tube being fully compressed; Fig. 3 is a view corresponding to Fig. 2 but illustrating the use of the mold in forming rods; Fig. 4 is a vertical, transverse, sectional view of a slightly modified form of mold, showing a green tube therein, the mold sections being in their initial positions; Fig. 5 is a view, corresponding to Fig. 4, showing the mold sections in their final positions and the tube fully compressed.

My improved mold disclosed in Figs. 1 to 3 may be formed of any suitable materials, such as steel, and in any desired sizes and proportions. The mold body comprises a bottom plate 10 having up-standing marginal flanges 11 between which are disposed side walls 12 the lower edges of which rest upon the upper face of the plate and bear against the flanges. A top or pressure plate 13 forms a closure for the mold and is provided with depending marginal flanges 14 which engage against the outer faces of the side walls 12 of the mold so that these side walls are held against any movement away from each other. The upper portions of the inner faces of the side walls, for a short distance, are vertically disposed, as indicated at 15, while the remainder of the inner faces of the side walls are inwardly and downwardly inclined, as indicated at 16.

Coöperating with the mold body is a stationary bottom split or forming member 17, which is disposed upon the bottom plate of the mold midway between the side walls, side wedging splits or forming-member 18 and a top split or forming-member 19. The inner faces of these splits are grooved or channeled in such manner that, when the splits are disposed wholly within the mold, as shown in Fig. 2, a cylindrical chamber is provided while, aside from this, the splits entirely fill the mold. The side splits 18 are of wedge-shape in order that they may be moved uniformly toward each other as they are forced into the mold along the inclined faces 16 of the side walls of the mold. The side faces of the top split 19 have beveled portions to engage against the upper portions of the inclined faces 16, and vertical portions to engage against the portions 15 of the side plates.

When employing the above described mold in the construction of a tube, a suitably impregnated sheet of fibrous material is wound about a cylindrical mandrel 20 to form a tube of the proper thickness and the tube, upon its mandrel, is positioned between the side splits 18, which are placed in the mold in the manner shown in Fig. 1, after which the top split 19 is applied. The top plate or cover 14 is then placed upon the top split 19, with the lower portions of its flanges 14 engaging against the outer faces of the side walls 12. The thus assembled mold, with its inclosed tube, is then placed in a suitable press and the press is closed to force the parts to a position shown in Fig. 2, heat being applied, in the meantime, in any suitable manner.

As the pressure is applied, the top split 19 is forced into engagement with the upper edges of the side splits 18 before any appreciable compression of the tube has taken place. The top split and side splits 18 are then forced downwardly in unison to compress the greater portion of the tube between them until the side splits 18 substantially engage against the side walls of the stationary splits 17. Any of the material of the tube which flows during this compression passes into the space provided between the stationary split and the side splits. Upon further movement of the top and side splits to their final positions, the remainder of the tube is fully compressed between the bottom and the side splits without escape of any material or pinching off of material such as would prevent complete closing of the mold.

The same operation applies in the formation of a rod or cylinder, as shown in Fig. 3, the rod being formed in any suitable manner, of any desired material and positioned in the mold in the same manner as the tube.

In Figs. 4 and 5, I have illustrated a slightly modified form of mold in which the inner faces of the side walls 21, instead of being formed as simple wedges, are stepped to provide, in each instance, a lower vertical surface 22 of somewhat less than half the height of the wall and a pair of upwardly and outwardly inclined surfaces 23 and 24 separated by an intermediate, vertical surface 25. In like manner, the outer faces of the side splits are stepped to provide, in each instance, an upper vertical surface 27, corresponding to the surface 25 of the side wall and a pair of downwardly and inwardly inclined surfaces 28 and 29, of extent and inclination corresponding to the surfaces 24 and 23, respectively, of the side wall and separated by a vertical, intermediate surface 30.

With this form of mold, a top plate and an upper split, corresponding to the plate 13 and split 19, may be employed or they may both be replaced by a top plate 31 corresponding to the top plate 13 but formed on its lower face with a projection 32 suitably grooved to replace the top split 19.

The manner of employing this latter form of mold is the same as that previously described with the exception, that, during the first downward movement of the side splits and top plate, the side splits are forced into actual engagement with the side walls of the bottom split, so that there is no possibility for material to escape from the mold. It should be noted that the engagement of the depending flanges of the top plate 31 with the side walls centers the split-forming projection 32 to insure its movement in the desired direction. In the mold shown in Figs. 1 to 3 inclusive, the vertical surface portions 15 of the side walls insure an almost immediate engagement of the top split 19 with the side walls as it is moved into the mold and a consequent, almost immediate, centering of the top split.

Obviously, a combined top plate and upper split, such as that shown in Fig. 4, may be employed with the type of side splits shown in Fig. 1, or a top split and separate top plate, such as are shown in Fig. 1, may be employed with the type of side splits and side walls shown in Fig. 4. In other words, various changes in the relative design of the several parts may be made, as deemed advisable, and I, therefore, reserve the right to make any changes which may come within the scope of the claims.

I claim as my invention:

1. A mold for rods, tubes and the like including a stationary forming-member, a plurality of additional forming-members movable with respect to each other and to the stationary forming-member to compress a body placed between them, and a common means for moving the additional forming-members to accomplish this compression.

2. A mold for rods, tubes and the like including a stationary forming-member, a plurality of additional-forming members, and means whereby pressure applied to one of the latter forming-members will first bring all of the latter forming members into their final positions relative to each other and certain of them into engagement with the stationary forming member and will then bring all of the additional forming members into their final positions relative to the stationary forming-member.

3. The combination with a mold body including a bottom and side walls, of a forming-member disposed on the bottom between the side walls, side forming-members, the inner faces of the walls and the outer faces of the side forming-members being inclined so that, as the side-forming members are passed into the mold body, they are forced toward each other and into engagement with the sides of the bottom-forming member, and a top-forming member engageable with the side-forming members to force them into the mold body, the several forming-members being so shaped that, when they are disposed in the mold body, they provide a cylindrical chamber between them.

4. The combination with a mold body including a bottom and side walls, of a forming-member disposed on the bottom between the side walls, side forming-members, the inner faces of the walls and the outer faces of the side forming-members being stepped to provide alternating vertical and inclined faces so that, as the side-forming members are passed into the mold body, they are forced toward each other and into engagement with the sides of the bottom forming-member, and a top forming-member engageable with the side forming-members to force them into the mold body, the several forming-members being so shaped that, when they are disposed in the mold body, they provide a cylindrical chamber between them.

5. The method of molding which comprises first molding all of a body save a narrow portion along one side and subsequently molding such portion.

6. The method of molding which comprises first closing mold sections about an entire body save along one side thereof and subsequently causing a mold section to exert pressure against such side.

In testimony whereof, I have hereunto subscribed my name this 25th day of Sept., 1918.

WILLARD H. KEMPTON.